United States Patent [19]
Ohmi et al.

[11] Patent Number: 5,757,095
[45] Date of Patent: May 26, 1998

[54] MOTOR HAVING AIR CIRCULATING COIL END

[75] Inventors: Masanori Ohmi, Anjo; Tsutomu Shiga, Nukata-gun; Kenji Ogishima, Nagoya, all of Japan

[73] Assignee: Denso Corporation, Aichi-pref., Japan

[21] Appl. No.: 800,458

[22] Filed: Feb. 18, 1997

[30] Foreign Application Priority Data

| Feb. 15, 1996 | [JP] | Japan | 8-027774 |
| Dec. 20, 1996 | [JP] | Japan | 8-341660 |

[51] Int. Cl.$^6$ .................................................. H02K 9/00
[52] U.S. Cl. ...................... 310/58; 310/52; 310/64; 310/65; 310/54; 310/60 R; 310/62
[58] Field of Search ................ 310/52, 58, 60 R, 310/64, 65, 54, 57, 62, 63, 270

[56] References Cited

U.S. PATENT DOCUMENTS

| 3,591,816 | 7/1971 | Sakamoto et al. | 310/58 |
| 4,009,405 | 2/1977 | Gleichman | 310/58 |
| 5,211,670 | 5/1993 | Ohmi et al. | 29/598 |
| 5,266,858 | 11/1993 | Ohmi et al. | 310/208 |
| 5,508,577 | 4/1996 | Shiga et al. | 310/201 |
| 5,625,242 | 4/1997 | Shiga et al. | 310/198 |

FOREIGN PATENT DOCUMENTS

| 58-86841 | 5/1983 | Japan | 310/65 |
| 7-298564 | 11/1995 | Japan | |

*Primary Examiner*—Steven L. Stephan
*Assistant Examiner*—Elvin Enad
*Attorney, Agent, or Firm*—Cushman Darby & Cushman IP Group of Pillsbury Madison & Sutro LLP

[57] ABSTRACT

In a small starter motor which has a substantially closed space therein, it is necessary to blow out brush dust particles therefrom. On a coil end surface or both coil end surfaces of an armature, a fan generating an air circulation is formed utilizing gaps formed between individual coil ends on the surface without adding any other parts. Also, a side wall is disposed next to the coil end surface in parallel thereto which closes an axial end of a yoke in which the armature is coaxially disposed. In the space formed between the side wall and the coil end surface, an air circulation is generated when the armature rotates. The side wall has an air inlet hole and the yoke has an air outlet hole. Air coming into the space from the air inlet hole is blown out from the air outlet hole by the circulation generated by the fan made on the coil end surface. The brush dust particles are blown out by the circulated air, and the coil ends are cooled off at the same time. A distance between the side wall and the coil end surface and a depth of the gaps formed between the individual coil ends have to be optimized to obtain a good air circulation.

11 Claims, 5 Drawing Sheets

MOTOR HAVING AIR CIRCULATING COIL END

CROSS-REFERENCE TO RELATED APPLICATIONS

This application is based upon and claims benefit of priority of Japanese Patent Applications No. Hei-8-27774 filed on Feb. 15, 1996 and No. Hei-8-341660 filed on Dec. 20, 1996, all of the contents of which are incorporated herein by reference.

BACKGROUND OF THE INVENTION

1. Field of the Invention

This invention relates to a motor in which air is circulated by coil ends of an armature of the motor. The motor is suitable for use in a starter motor for an automotive vehicle.

2. Description of Related Art

Since it is required recently to make a starter motor small in size and light in weight to install it in a congested engine compartment and to save fuel consumption, a starter having a reduction device therein is popularly used. As a motor becomes smaller, an inside space of the motor becomes smaller, accordingly. In a small inside space of the motor, brush powder particles, grease particles and the like scattered in the space cause various problems. Especially, in the space like that of a starter motor which is substantially closed for sealing water, the problems become more serious.

To cope with the problems, various measures such as increasing a creeping discharge distance in the confined space, adding insulators to prevent any possible discharges and the like have been proposed and used. One measure has been proposed in Japanese Patent Application No. Hei-7-298564. It teaches to create an air circulation in a small space of a motor in which one coil end is eliminated and used as a commutator to decrease the size of the motor. The air circulation contributes to cooling off heat generated by friction between a commutator and brushes. The proposed air circulation, however, is not enough to blow off brush particles.

SUMMARY OF THE INVENTION

The present invention has been made in view of the above-mentioned problems, and an object of the present invention is to provide a motor having an air circulation therein created by coil ends which is able not only to cool off the inside of the motor but to blow off brush particles, and more particularly to provide a starter motor having such a motor.

In order to provide an effective way to blow off the brush dust particles from a substantially closed small motor space to the outside thereof, this invention utilizes coil end surfaces made on both axial ends of an armature as fans for generating an air circulation without using any additional parts. The coil end surface has a plurality of coil ends connecting coils wound in an armature core, and there are gaps between individual coil ends. These gaps on the coil end surface are formed in an arc-shape which functions as a fan when the armature rotates.

On the other hand, a side wall for closing an axial opening of a yoke containing the armature therein is disposed next to the coil end surface in parallel thereto. A small space is formed between the side wall and the coil end surface in which an air circulation is generated as the armature rotates. Air in the space flows from an inside of the coil end surface to an outside along the gaps formed on the surface.

The circulating air is taken in from the outside through a hole made on the side wall and flows out through a hole made on the yoke. The brush dust particles are carried away by the circulating air, and the coil ends are cooled off at the same time. To generate an air circulation enough to blow off the brush dust particles, it is necessary to select a dimensional ratio between a parallel width "m" of the space made by the side wall and the coil end surface and a depth "d" of the gap formed on the coil end surface in a certain range. It was found out that the ratio m/d has to be less than 1 according to the present invention.

One of the coil end surfaces can be used as a commutator on which brushes slide to supply an electric power to the motor. The side wall may be made at either side of the armature or both sides, which can be selected according to design needs.

The motor having an air circulating coil end is particularly suitable for use in a small size starter having a speed reduction gear device.

Other objects and features of the present invention will become more readily apparent from a better understanding of the preferred embodiments described below with reference to the following drawings.

DETAILED DESCRIPTION OF THE PREFERRED EMBODIMENTS

Figure 1:
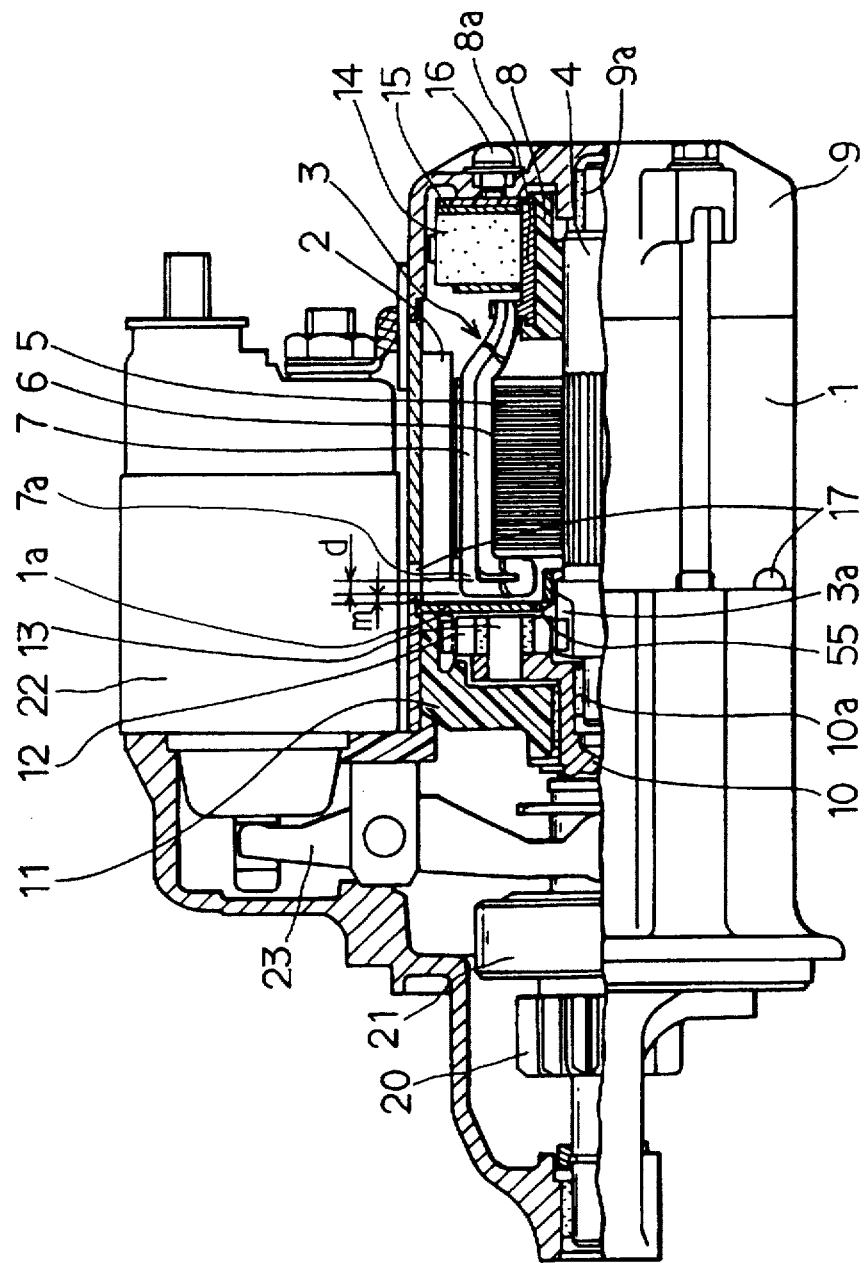
FIG. 1 is a whole view of a starter motor, partially cross-sectioned, showing a first embodiment according to the present invention.

FIG. 1 is a whole view of a starter motor showing a first embodiment of the present invention. The starer motor is used for an automotive vehicle. The starter motor is composed of a motor, a speed reduction device having a planetary gear mechanism for reducing a rotational speed of the motor, a pinion device for cranking a ring gear of an engine and a magnet switch for making the pinion engage with the ring gear.

The motor is a direct current motor and substantially composed of a yoke 1 having a plurality of field magnets 2, an armature 3 and brushes 14 held by a brush holder 15. The armature 3 has a rotational shaft 4 having an armature core 5 and a commutator 8, both fixed thereto. The armature shaft 4 is supported by a bearing 9a disposed on an end frame 9 at its right and a bearing 10a disposed in a drive shaft 10 at its left. On the outer periphery of the armature core 5, a plurality of slots 6 is formed to contain armature coils 7 therein. Each armature coil 7 is composed of an upper and a lower coil and a coil end 7a connecting the upper and the lower coils. One end of each coil is connected to the commutator 8.

The planetary gear reduction device is composed of a sun gear 3a formed on the armature shaft 4, planetary gears 12 which engage with the sun gear 3a and are rotatably supported by pins 13 connected to a drive shaft 10, and an internal gear 11 fixed to the yoke 1. The planet gears 12 also engage with the internal gear 11. A rotational torque of the motor is transmitted to the drive shaft 10 by an orbital rotation of the planetary gears 12 around the sun gear 3a.

The pinion device includes the pinion 20 and a one-way clutch 21 which transmits a motor torque to the pinion, not vice versa. The pinion device is connected to the drive shaft 10 by a helical connection. The pinion device is shifted to the left by a shift lever 23 driven by the magnet switch 22 to engage with a ring gear of an engine.

A brush holder 15 holding brushes 14 therein which contact a commutator surface 8a is fixed to the end frame 9 with screws 16.

Figure 2:
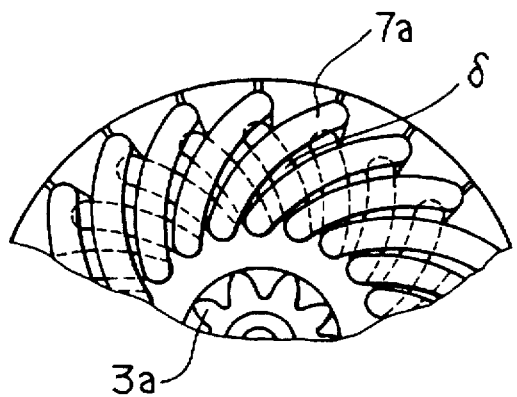
FIG. 2 is a plan view showing a coil end surface of a motor according to the present invention.

As shown in FIG. 2, the coil end 7a connecting the upper and the lower coils is formed in an arc-shape at the left side of the armature core 5. The coil end 7a is arranged to have a gap δ to a neighboring coil end 7a. Facing the coil end 7a in parallel therewith, a side wall 1a is disposed in the yoke 1 to separate a motor space from a space for the reduction device. An air inlet hole 55 is formed on the side wall 1a at a position close to the armature shaft 4, and an air outlet hole 17 is formed on the yoke 1 at a position close to the side wall 1a.

When the armature 3 rotates, an air circulation is generated by the coil ends 7a, because a plurality of the coil ends arranged with the gap δ function as a fan. Air flows in from the air inlet hole 55 and flows out from the air outlet hole 17. A depth of the gap δ is the same as a thickness "d" of the coil (when a coil having a rectangular cross-section is used) or a diameter "d" of the coil (when a round coil is used).

Figure 3:
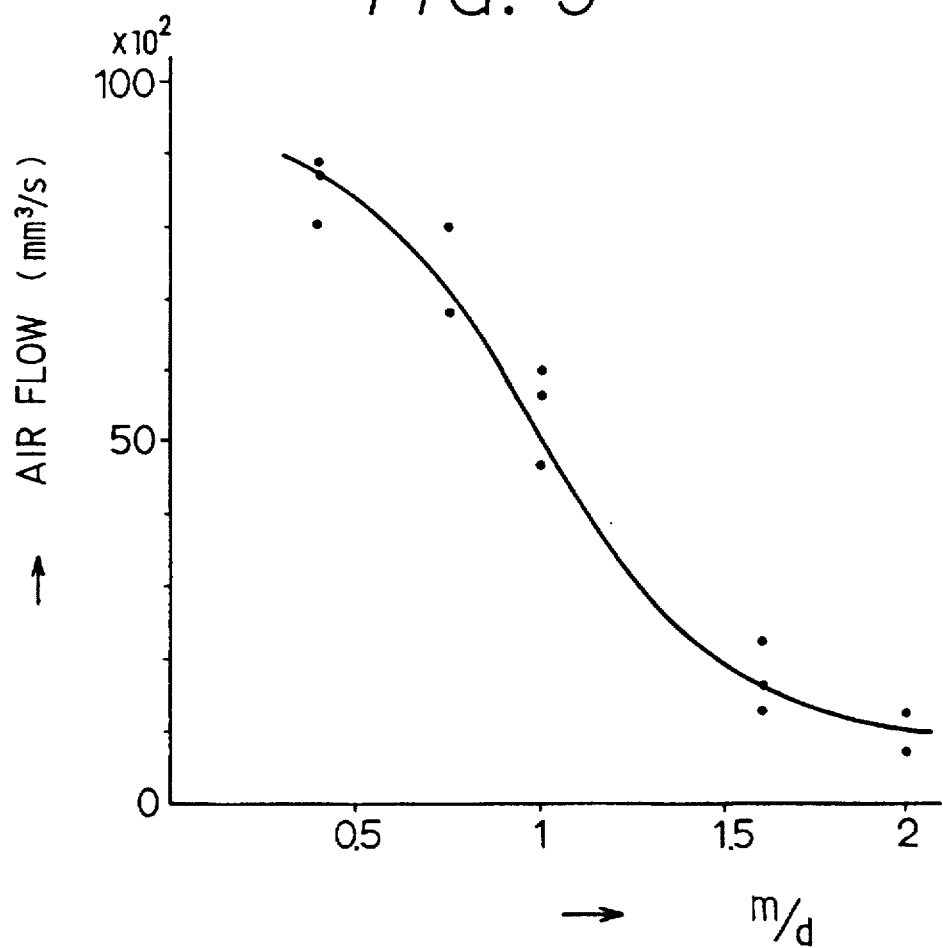
FIG. 3 is a graph showing an air flow created by a coil end surface versus a dimension ratio m to d.

The side wall 1a is disposed with a distance "m" from the coil end 7a. A relation between an air flow generated by the coil ends and a dimension ratio m/d is shown in FIG. 3. To plot this graph, the first embodiment having the air outlet hole 17 of a 6 mm diameter is used. The dimension "d" is kept constant at 2.0 mm while the dimension "m" is varied. The air flow is measured at the air outlet hole 17. The graph shows that the more air flow is attained when the dimension ratio m/d is smaller than 1.

The brush dust particles are effectively exhausted to the outside of the motor space through the air outlet hole 17 by the air circulation.

Figure 4:
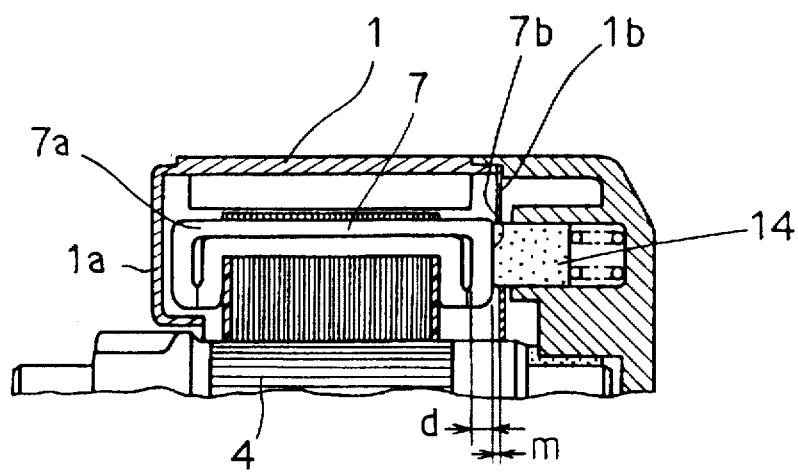
FIG. 4 is a cross-sectional view of a motor showing a second embodiment according to the present invention.
Figure 5:
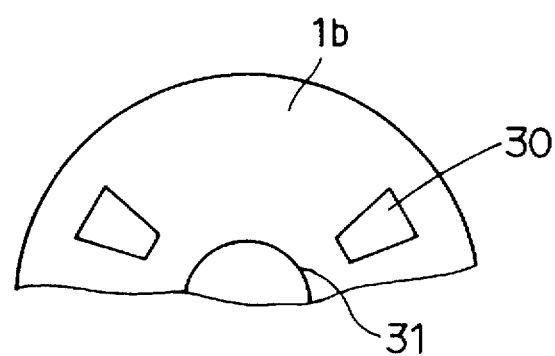
FIG. 5 is a partial plan view showing a second side wall used in the second embodiment.

FIG. 4 shows a second embodiment according to the present invention, in which a second side wall 1b is disposed at the right side of the armature in addition to the first side wall 1a disposed at the left side. FIG. 5 shows the second side wall viewed from the right in FIG. 4. It has brush holes 30 through which the brushes 14 are inserted and an armature shaft hole 31. In this embodiment, the other coil end 7b is formed in a similar shape as that of the coil end 7a so that the coil end 7b can generate the air circulation. The coil end 7b is also used as a commutator surface on which the brushes 14 slide. The second side wall 1b is disposed in the yoke 1 with the distance "m" from the coil end 7b. The thickness or the diameter of the coil forming the coil end 1b is "d" as in the first embodiment.

The dimension ratio m/d is selected to be less than 1, so that more air circulation is generated by the coil end 7b. In this embodiment, not only the brush dust particles are effectively blown out by the air circulation but also the coil end surface 7b on which the brushes slide is properly cooled off. Though, in the second embodiment, the side wall 1b is disposed in addition to the side wall 1a, the side wall 1b alone can perform the similar function as mentioned above. In other words, the left side structure of the coil end may be a conventional one.

Figure 6:
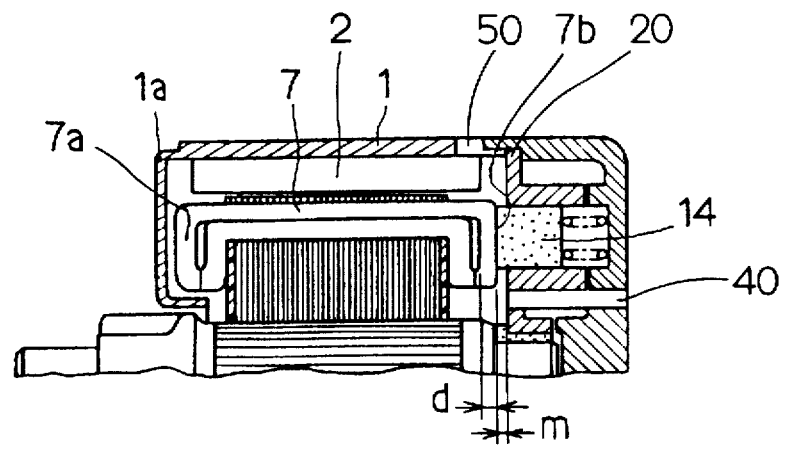
FIG. 6 is a cross-sectional view of a motor showing a third embodiment according to the present invention.

FIG. 6 shows a third embodiment according to the present invention, in which a brush holder plate 20 is used in place of the second side wall 1b of the second embodiment. The brush holder plate 20 is made of a heat conductive magnetic material. An air inlet hole 40 is made in the end frame at a position facing the inside of the coil end 7b, and an air outlet hole 50 is formed on the yoke 1 at a radial outside of the coil end 7b. Air flows in from the air inlet hole 40 and flows out from the air outlet hole 50 by the circulation generated by the coil end 7b.

Figure 8:
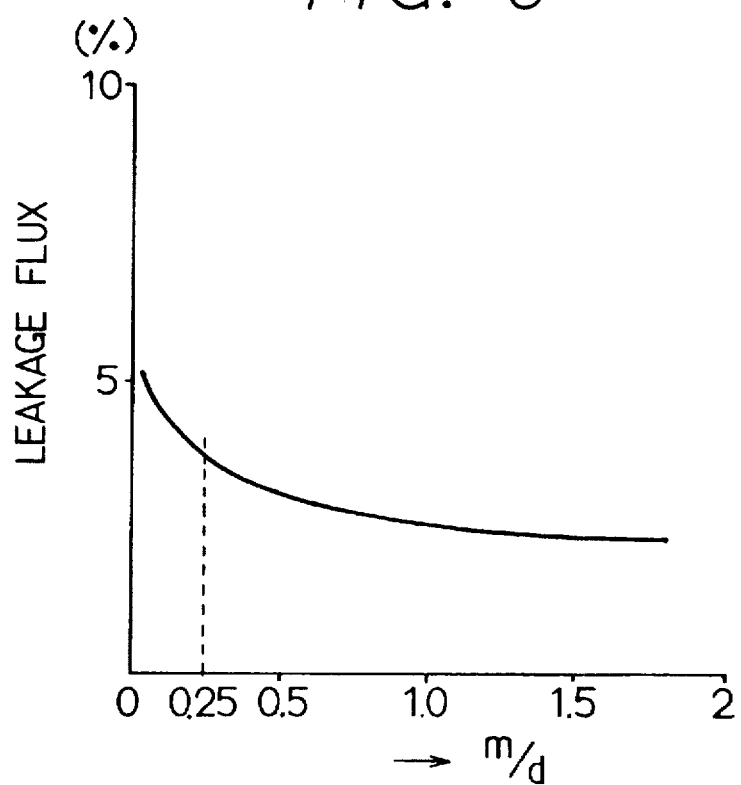
FIG. 8 is a graph showing a relation between a leakage flux and the dimension ratio m to d.

Since the holder plate 20 which also serves as the second side wall is made of a magnetic material, it can not be placed too close to the permanent magnet 2. If it is too close to the magnet 2, magnetic flux leaks through the brush holder plate 20. The leakage flux was measured for various "m" while keeping the dimension "d" constant at 2 mm. The leakage flux versus the dimension ratio m/d is shown in FIG. 8. As the ratio m/d becomes less than 0.25, the leakage flux becomes an intolerable level.

Figure 7:
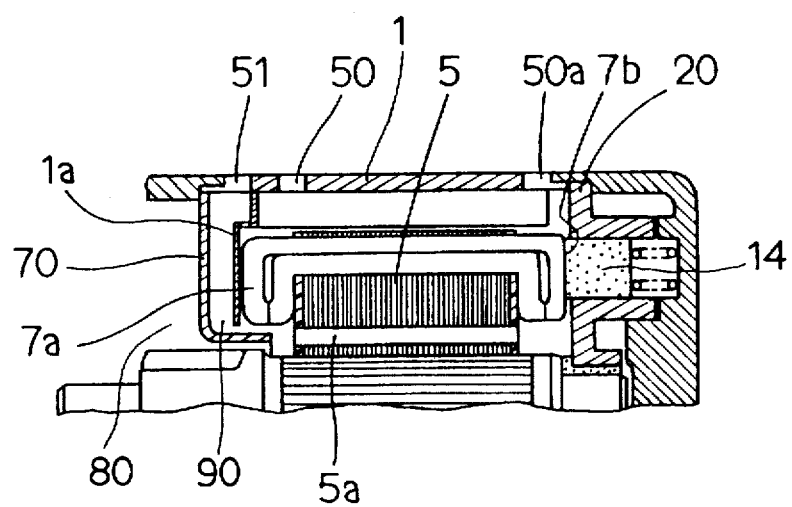
FIG. 7 is a cross-sectional view of a motor showing a fourth embodiment according to the present invention.

FIG. 7 shows a fourth embodiment according to the present invention. In this embodiment, a through-hole 5a is formed in the armature core 5, and a separating cover 70 which separates a motor space 90 from a reduction gear space 80 is disposed in parallel with the first side wall 1a. An air inlet hole 51 is formed on the yoke 1 at a position between the first side wall 1a and the separating cover 70. Two air inlet holes 50 and 50a are also formed on the yoke 1 as shown in the drawing.

Air circulated by the coil end 7a flows in from the air inlet hole 51, flows through the space between the separating cover 70 and the first side wall 1a, and flows out through the air outlet hole 50, thereby cooling off the coil end 7a. On the other hand, air circulated by the coil end 7b flows from the air inlet hole 51 to the air outlet hole 50a through the space between the separating cover 70 and the first side wall 1a and the through-hole 5a, thereby cooling off the coil end 7b and blowing off the brush dust particles at the same time. This embodiment is especially suitable to a starter motor which is small in size having a high rotational speed and has a tendency to produce much of the brush dust.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A motor comprising:

a cylindrical yoke having a magnetic field device fixed thereto;

an armature, disposed in the yoke coaxially therewith, having an armature core on which armature coils are wound and a commutator connected to the armature coils;

brushes for supplying electric power to the armature coils, slidably connected to the commutator;

a side wall for closing an axial end of the yoke disposed perpendicularly to an axis of the yoke; and a coil end surface formed by coil ends connecting the armature coils at an end of the armature core in parallel to the side wall, forming an air circulating fan with gaps formed between neighboring coil ends on the coil end surface, wherein:

a distance "m" between the side wall and the coil end surface is smaller than a depth "d" of the gaps; and an air circulation is generated in a space between the side wall and the coil end surface when the armature rotates.

2. A motor according to claim 1, wherein each coil end forming the air circulating fan is arc-shaped so that air flows from an inside to an outside of the coil end surface.

3. A motor according to claim 1, wherein the coil end surface serves as the commutator on which the brushes slide.

4. A motor according to claim 1, wherein the side wall is disposed at a side of the armature opposite to a side where the brushes are disposed.

5. A motor according to claim 1, wherein the side wall is disposed at both sides of the armature.

6. A motor according to claim 3, wherein the side wall disposed at the brush side holds the brushes therein.

7. A motor according to claim 6, wherein the side wall holding the brushes therein is made of a heat conductive magnetic material and a dimension ratio m/d is larger than 0.25.

8. A motor according to claim 3, wherein an air inlet hole is made on the side wall disposed at the brush side and an air outlet hole is made on the yoke.

9. A motor according to claim 5, an air passage is formed through the armature core.

10. A motor according to claim 1, wherein the motor is connected to a rotational speed reduction gear device to form a starter.

11. A motor according to claim 4, wherein an air inlet hole is made on the side wall and an air outlet hole is made on the yoke.

* * * * *